United States Patent
Kuriyagawa et al.

(10) Patent No.: US 8,926,383 B2
(45) Date of Patent: Jan. 6, 2015

(54) OUTBOARD MOTOR CONTROL APPARATUS

(75) Inventors: Koji Kuriyagawa, Saitama (JP); Hiroshi Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 246 days.

(21) Appl. No.: 13/365,667

(22) Filed: Feb. 3, 2012

(65) Prior Publication Data

US 2012/0208413 A1    Aug. 16, 2012

(30) Foreign Application Priority Data

Feb. 16, 2011 (JP) .................. 2011-031192
Feb. 16, 2011 (JP) .................. 2011-031193
Feb. 16, 2011 (JP) .................. 2011-031194

(51) Int. Cl.
| | |
|---|---|
| B63H 21/21 | (2006.01) |
| B63H 20/20 | (2006.01) |
| B63H 23/30 | (2006.01) |
| B63H 20/14 | (2006.01) |
| F02D 41/02 | (2006.01) |
| F02D 43/00 | (2006.01) |
| F02D 11/10 | (2006.01) |
| F16H 63/50 | (2006.01) |

(52) U.S. Cl.
CPC .............. *B63H 20/20* (2013.01); *B63H 23/30* (2013.01); *B63H 20/14* (2013.01); *B63H 21/21* (2013.01); *F02D 41/0225* (2013.01); *F02D 43/00* (2013.01); *F02D 11/105* (2013.01); *F16H 63/50* (2013.01); *F02D 2200/502* (2013.01)

USPC .................................. 440/84; 440/1; 440/87

(58) Field of Classification Search
USPC ................................ 440/1, 49, 75, 84, 86, 87
See application file for complete search history.

(56) References Cited

U.S. PATENT DOCUMENTS

| | | |
|---|---|---|
| 5,122,084 A | 6/1992 | Lieb et al. |
| 5,545,064 A | 8/1996 | Tsunekawa et al. |
| 2006/0046585 A1* | 3/2006 | Harada et al. .................. 440/84 |
| 2006/0135314 A1* | 6/2006 | Shomura et al. ............. 477/109 |

FOREIGN PATENT DOCUMENTS

JP         3-079496 A        4/1991

* cited by examiner

*Primary Examiner* — Stephen Avila
*Assistant Examiner* — Anthony Wiest
(74) *Attorney, Agent, or Firm* — Carrier Blackman & Associates, P.C.; Jospeh P. Carrier; Jeffrey T. Gedeon

(57) ABSTRACT

In an apparatus for controlling operation of an outboard motor having a shift shaft to be rotated in response to manipulation by an operator to switch a shift position between an in-gear position that enables driving force of a prime mover to be transmitted to a propeller by engaging a clutch with one of a forward gear and a reverse gear, and a neutral position that cuts off transmission of the driving force by disengaging the clutch from the forward or reverse gear, comprising a neutral operation detector connected to the shift shaft and adapted to detect a neutral operation in which the shift position is switched from the in-gear position to the neutral position; and a driving force controller adapted to conduct driving force decreasing control to decrease the driving force of the prime mover when the neutral operation is detected.

17 Claims, 15 Drawing Sheets

OUTBOARD MOTOR CONTROL APPARATUS

BACKGROUND

1. Technical Field

Embodiments of the invention relate to an outboard motor control apparatus, particularly to an apparatus for controlling driving force of a prime mover (internal combustion engine) mounted on an outboard motor to mitigate load on the operator caused by manipulating of a shift lever.

2. Background Art

Conventionally, there is proposed a technique of an outboard motor control apparatus to displace a clutch in response to the manipulation of a shift lever by the operator, so that a shift position can be switched between a so-called in-gear position, i.e., forward or reverse position, in which a forward or reverse gear is in engagement and the driving force of a prime mover (internal combustion engine) is transmitted to a propeller, and a neutral position in which the engagement is released and the transmission of the driving force is cut off, as taught, for example, by Japanese Laid-Open Patent Application No. Hei 3 (1991)-79496.

In the reference, a contact switch is provided at the shift lever and when a fact that the shift lever is manipulated from the in-gear position to the neutral position and reaches a predetermined manipulation position, is detected through the switch, the ignition cut-off of the engine (prime mover) is carried out to start driving force decreasing control. Consequently, it makes easy to release the engagement of the clutch with the forward or reverse gear (in-gear condition), thereby mitigating burden or load on the operator caused by the shift lever manipulation.

SUMMARY

However, in the technique of the reference, since the switch is provided at the shift lever, the configuration of the shift lever has to be greatly changed and it causes the complicated structure, disadvantageously. Further, when the switch is installed at the shift lever, it is difficult to appropriately set the operating point of the switch and therefore, it hampers the start of the driving force decreasing control at the right timing.

An object of embodiments of this invention is therefore to overcome the foregoing problem by providing an outboard motor control apparatus that can decrease the driving force of a prime mover at the right timing, thereby mitigating the load on the operator caused by the shift lever manipulation.

In order to achieve the object, the embodiments of the invention provide in the first aspect an apparatus for controlling operation of an outboard motor having a shift shaft to be rotated in response to manipulation by an operator to switch a shift position between an in-gear position that enables driving force of a prime mover to be transmitted to a propeller by engaging a clutch with one of a forward gear and a reverse gear, and a neutral position that cuts off transmission of the driving force by disengaging the clutch from the forward or reverse gear, comprising: a neutral operation detector connected to the shift shaft and adapted to detect a neutral operation in which the shift position is switched from the in-gear position to the neutral position; and a driving force controller adapted to conduct driving force decreasing control to decrease the driving force of the prime mover when the neutral operation is detected.

In order to achieve the object, the embodiments of the invention provide in the second aspect a method for controlling operation of an outboard motor having a shift shaft to be rotated in response to manipulation by an operator to switch a shift position between an in-gear position that enables driving force of a prime mover to be transmitted to a propeller by engaging a clutch with one of a forward gear and a reverse gear, and a neutral position that cuts off transmission of the driving force by disengaging the clutch from the forward or reverse gear, and a neutral operation detector connected to the shift shaft and adapted to detect a neutral operation in which the shift position is switched from the in-gear position to the neutral position, comprising the step of: conducting driving force decreasing control to decrease the driving force of the prime mover when the neutral operation is detected.

BRIEF DESCRIPTION OF DRAWINGS

The above and other objects and advantages of embodiments of the invention will be more apparent from the following description and drawings in which.

DESCRIPTION OF EMBODIMENTS

An outboard motor control apparatus according to embodiments of the present invention will now be explained with reference to the attached drawings.

Figure 1:
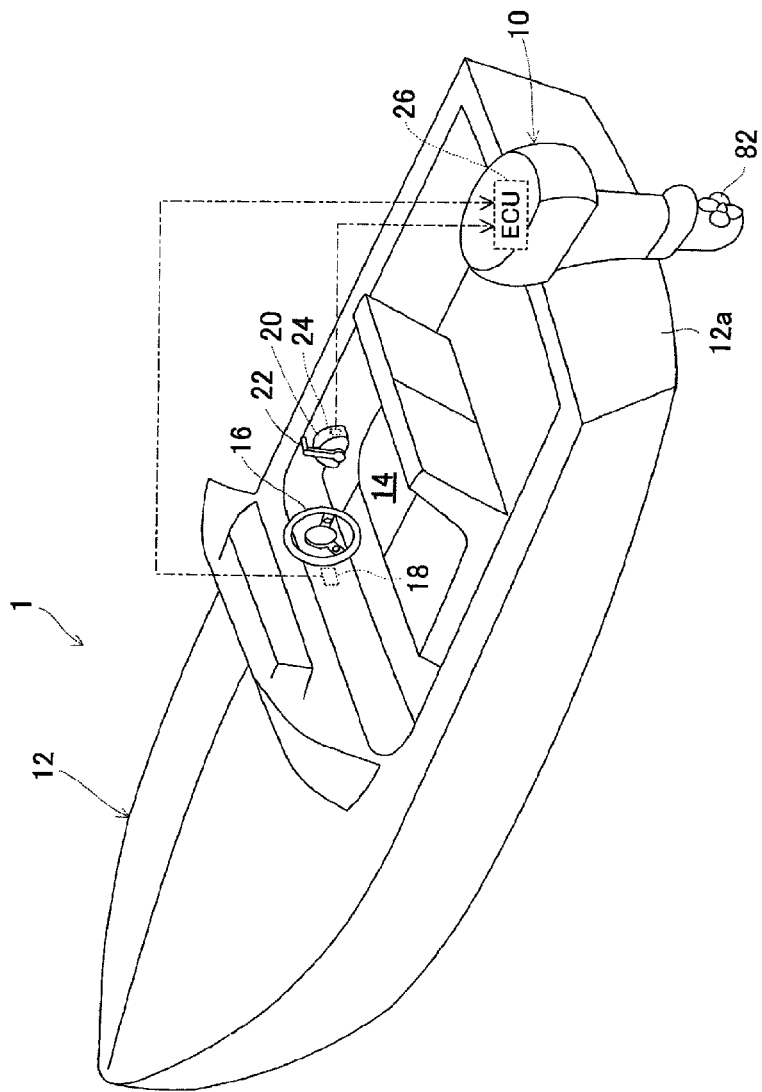
FIG. 1 is an overall schematic view of an outboard motor control apparatus including a boat according to a first embodiment of the invention.
Figure 2:
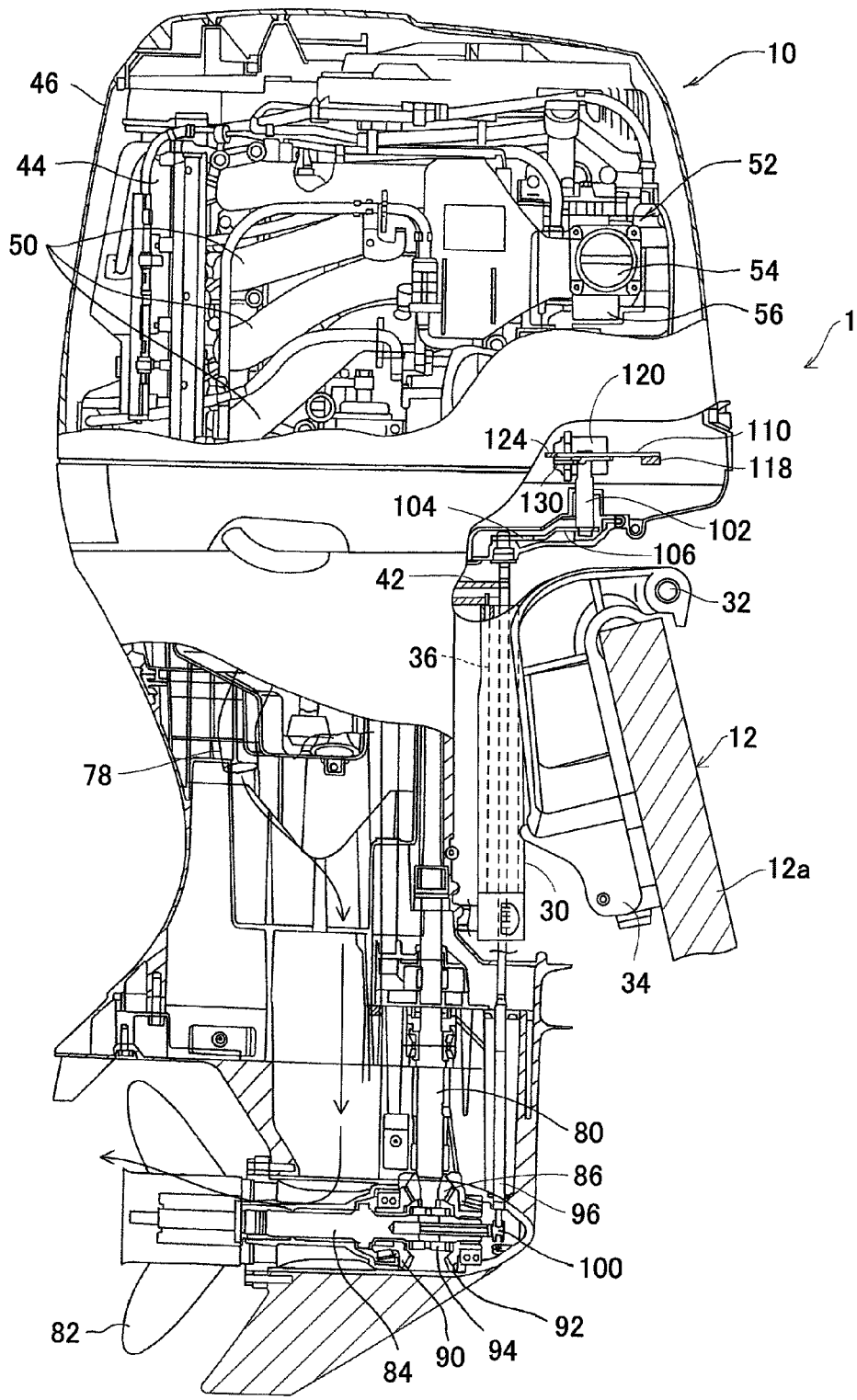
FIG. 2 is an enlarged sectional side view partially showing the outboard motor shown in FIG. 1.

FIG. 1 is an overall schematic view of an outboard motor control apparatus including a boat according to a first embodiment of the invention. FIG. 2 is an enlarged sectional side view partially showing the outboard motor shown in FIG. 1 and FIG. 3 is an enlarged side view of the outboard motor.

Figure 3:
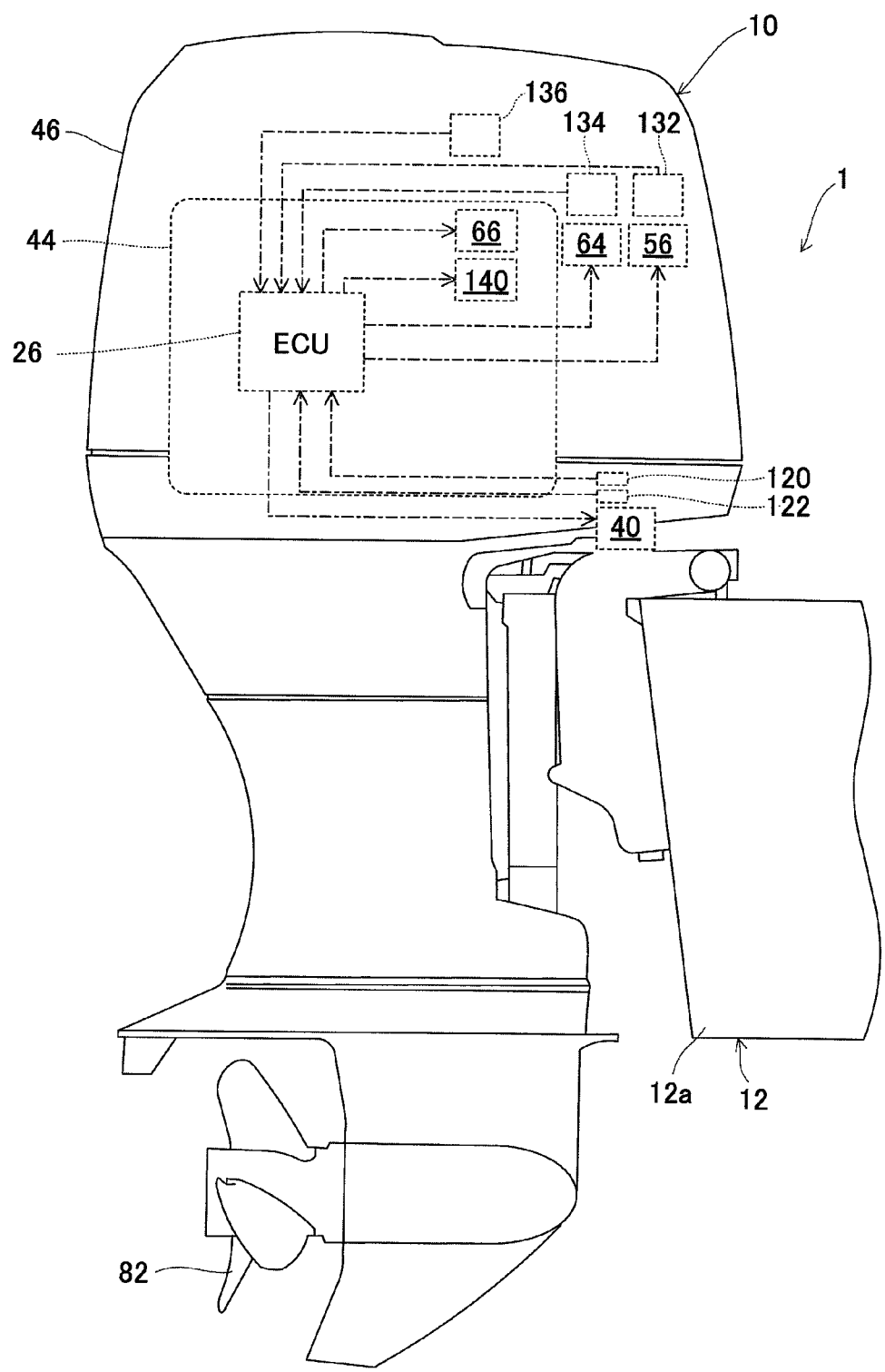
FIG. 3 is an enlarged side view of the outboard motor shown in FIG. 1.

In FIGS. 1 to 3, symbol 1 indicates the boat or vessel whose hull 12 is mounted with the outboard motor 10. The outboard motor 10 is clamped (fastened) to the stern or transom 12a of the hull 12.

As shown in FIG. 1, a steering wheel 16 is installed near a cockpit (the operator's seat) 14 of the hull 12 to be manipulated by the operator (not shown). A steering angle sensor 18 is attached on a shaft (not shown) of the steering wheel 16 to produce an output or signal corresponding to the steering angle applied or inputted by the operator through the steering wheel 16.

A remote control box 20 is provided near the cockpit 14 and is equipped with a shift lever (shift/throttle lever) 22 installed to be manipulated by the operator. The lever 22 can be moved or swung in the front-back direction from the initial position and is used to input a shift change command (forward, reverse and neutral switch command) and an engine speed regulation command including an engine acceleration and deceleration command. A lever position sensor 24 is installed in the remote control box 20 and produces an output or signal corresponding to a position of the lever 22.

The outputs of the steering angle sensor 18 and lever position sensor 24 are sent to an Electronic Control Unit (ECU) 26 disposed in the outboard motor 10. The ECU 26 has a microcomputer including a CPU, ROM, RAM and other devices.

As clearly shown in FIG. 2, the outboard motor 10 is fastened to the hull 12 through a swivel case 30, tilting shaft 32 and stern brackets 34.

An electric steering motor (actuator; only shown in FIG. 3) 40 for driving a swivel shaft 36 which is housed in the swivel case 30 to be rotatable about the vertical axis, is installed at the upper portion in the swivel case 30. The rotational output of the steering motor 40 is transmitted to the swivel shaft 36 via a speed reduction gear mechanism (not shown) and mount frame 42, whereby the outboard motor 10 is rotated or steered about the swivel shaft 36 as a steering axis to the right and left directions (steered about the vertical axis).

An internal combustion engine (prime mover; hereinafter referred to as the "engine") 44 is disposed at the upper portion of the outboard motor 10. The engine 44 comprises a spark-ignition, V-type, six-cylinder gasoline engine with a displacement of 3,500 cc. The engine 44 is located above the water surface and covered by an engine cover 46.

An air intake pipe 50 of the engine 44 is connected to a throttle body 52. The throttle body 52 has a throttle valve 54 installed therein and an electric throttle motor (actuator) 56 for opening and closing the throttle valve 54 is integrally disposed thereto.

The output shaft of the throttle motor 56 is connected to the throttle valve 54 via a speed reduction gear mechanism (not shown). The throttle motor 56 is operated to open and close the throttle valve 54, thereby regulating the flow rate of the air sucked in the engine 44.

Figure 4:
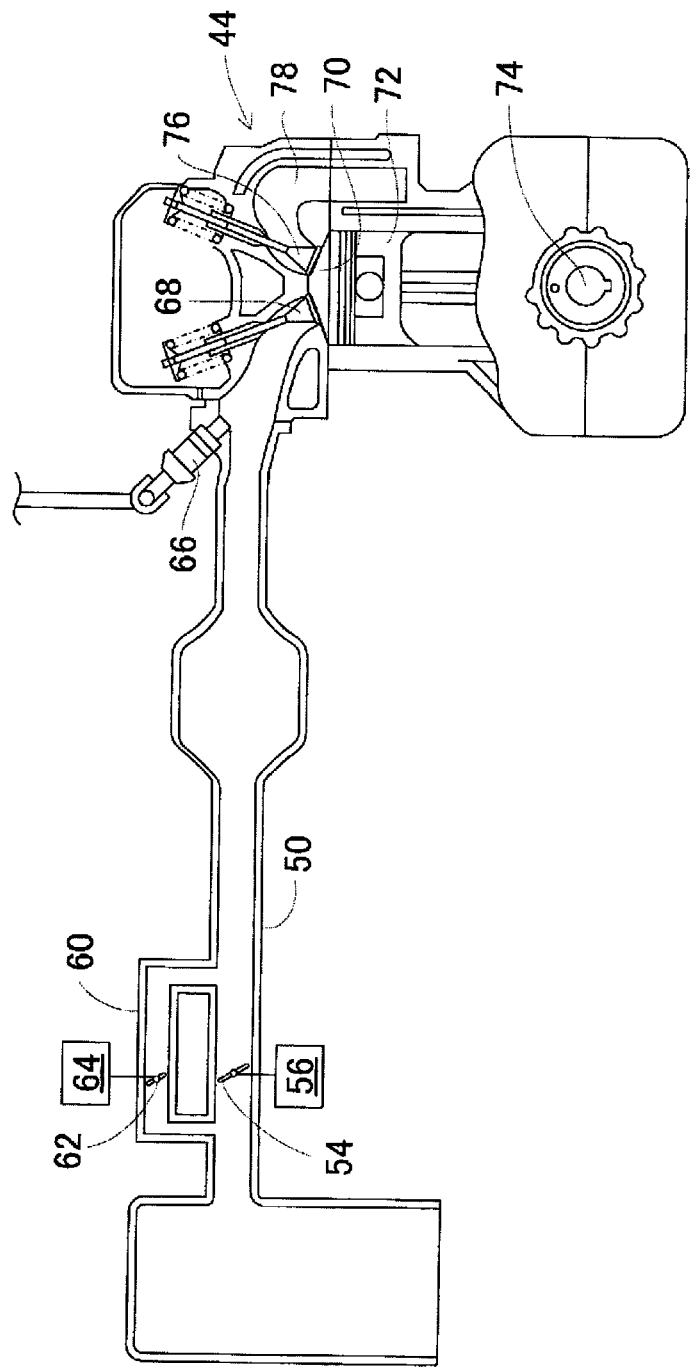
FIG. 4 is a schematic view of an internal combustion engine shown in FIG. 2, etc.

FIG. 4 is a schematic view of the engine 44 shown in FIG. 2, etc.

The explanation of the engine 44 is further made with reference to FIG. 4. The air intake pipe 50 is connected with a bypass (secondary air passage) 60 interconnecting the upstream side and downstream side of the throttle valve 54 to bypass the throttle valve 54. A secondary air flow rate regulating valve 62 for regulating the flow rate of intake air when the engine 44 is idling is installed in the bypass 60. The valve 62 is connected to a secondary air flow rate regulating electric motor (actuator) 64 through a speed reduction gear mechanism (not shown) and the motor 64 is operated to open and close the valve 62, thereby regulating the air flow rate in the bypass 60.

In the air intake pipe 50, an injector 66 is installed downstream of the throttle valve 54 and near the intake port of the air intake pipe 50 for injecting gasoline fuel into the intake air regulated by the throttle valve 54 and secondary air flow rate regulating valve 62. The injected fuel mixes with intake air to form air-fuel mixture that flows into a combustion chamber 70 when an intake valve 68 is opened.

The air-fuel mixture flowing into the combustion chamber 70 is ignited by a spark plug (not shown) and burned, thereby driving a piston 72 downward in FIG. 4 to rotate a crankshaft 74. When an exhaust valve 76 is opened, the exhaust gas produced by the combustion passes through an exhaust pipe 78 to be discharged outside the engine 44.

The outboard motor 10 is equipped with a power source (not shown) such as a battery attached to the engine 44 to supply operating power to the motors, etc.

As shown in FIG. 2, the outboard motor 10 has a drive shaft 80 that is rotatably supported in parallel with the vertical axis and a propeller shaft 84 that is supported to be rotatable about the horizontal axis and attached at its one end with a propeller 82.

The drive shaft 80 is connected at its upper end with the crankshaft 74 (not shown in FIG. 2) of the engine 44 and at its lower end with a pinion gear 86. The propeller shaft 84 is provided with a forward gear (forward bevel gear) 90 and reverse gear (reverse bevel gear) 92 to be rotatable. The forward and reverse gears 90, 92 are engaged (meshed) with the pinion gear 86 to be rotated in the opposite directions. A clutch 94 is installed between the forward and reverse gears 90, 92 to be rotated integrally with the propeller shaft 84.

The clutch 94 is displaced in response to the manipulation of the shift lever 22. When the clutch 94 is engaged with the forward gear 90, the rotation of the drive shaft 80 is transmitted to the propeller shaft 84 through the pinion gear 86 and forward gear 90, so that the propeller 82 is rotated to generate the thrust acting in the direction of making the hull 12 move forward. Thus the forward position is established.

On the other hand, when the clutch 94 is engaged with the reverse gear 92, the rotation of the drive shaft 80 is transmitted to the propeller shaft 84 through the pinion gear 86 and reverse gear 92, so that the propeller 82 is rotated in the opposite direction from the forward moving to generate the thrust acting in the direction of making the hull 12 move backward (reverse). Thus the reverse position is established.

When the clutch 94 is not engaged with either one of the forward and reverse gears 90, 92, the rotation of the drive shaft 80 to be transmitted to the propeller shaft 84 is cut off. Thus the neutral position is established.

The configuration that the shift position can be switched by displacing the clutch 94 will be explained in detail. The clutch 94 is connected via a shift slider 100 to the bottom of a first shift shaft 96 that is rotatably supported in parallel with the vertical direction. The upper end of the first shift shaft 96 is positioned in the internal space of the engine cover 46 and a second shift shaft (shift shaft) 102 is disposed in the vicinity thereof to be rotatably supported in parallel with the vertical direction.

The upper end of the first shift shaft 96 is attached with a first gear 104, while the bottom of the second shift shaft 102 is attached with a second gear 106. The first and second gears 104, 106 are meshed with each other.

Figure 5:
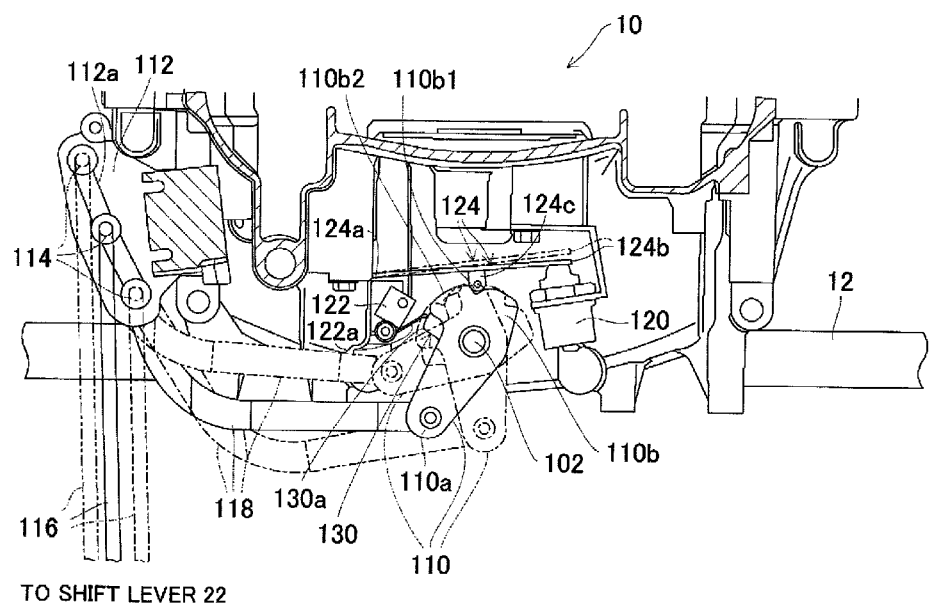
FIG. 5 is a plan view showing a region around a second shift shaft shown in FIG. 2 when viewed from the top.

FIG. 5 is a plan view of a region around the second shift shaft 102 shown in FIG. 2 when viewed from the top. In FIG. 5, the second gear 106 and the like are omitted for ease of understanding and ease of illustration. Further, the drawing of FIG. 5 is defined so that the bottom side on plane of paper is the hull 12 side.

As shown in FIG. 5, the upper end of the second shift shaft 102 is fixed with a shift arm 110. A shift link bracket 112 bored with a long hole 112a is installed at an appropriate position of the outboard motor 10 and the long hole 112a is movably inserted with a link pin 114.

The link pin 114 is connected to the shift lever 22 of the hull 12 through a push-pull cable 116, and also rotatably connected to one end 110a of the shift arm 110 through a link 118 having a substantially L-shape as viewed from the top.

As thus configured, upon the manipulation of the shift lever 22 by the operator, the push-pull cable 116 is operated to move the link pin 114 along the long hole 112a and the link 118 is displaced accordingly, so that the shift arm 110 is rotated or swung about the second shift shaft 102 as the rotation axis.

Further explanation is made with reference to FIG. 2. The rotation of the second shift shaft 102 is transmitted through the second gear 106 and first gear 104 to the first shift shaft 96 to rotate it and the rotation of the first shift shaft 96 displaces the shift slider 100 and clutch 94 appropriately, thereby switching the shift position among the forward, reverse and neutral positions, as mentioned above. Note that, in FIG. 5, solid lines indicate the neutral shift position, alternate long and short dashed lines the forward position and alternate long and two short dashed lines the reverse position.

Thus, in response to the manipulation of the operator, the second shift shaft 102 is rotated to engage the clutch 94 with one of the forward and reverse gears 90, 92 to establish the in-gear position (i.e., forward or reverse position) that enables the driving force (output) of the engine 44 to be transmitted to the propeller 82 and to disengage the clutch 94 to establish the neutral position that cuts off the transmission of the driving force, thereby switching the shift position.

A neutral switch (contact switch) 120 and shift switch (contact switch) 122 are disposed near the second shift shaft 102 so that the shaft 102 is arranged between the switches 120, 122.

Figure 6:
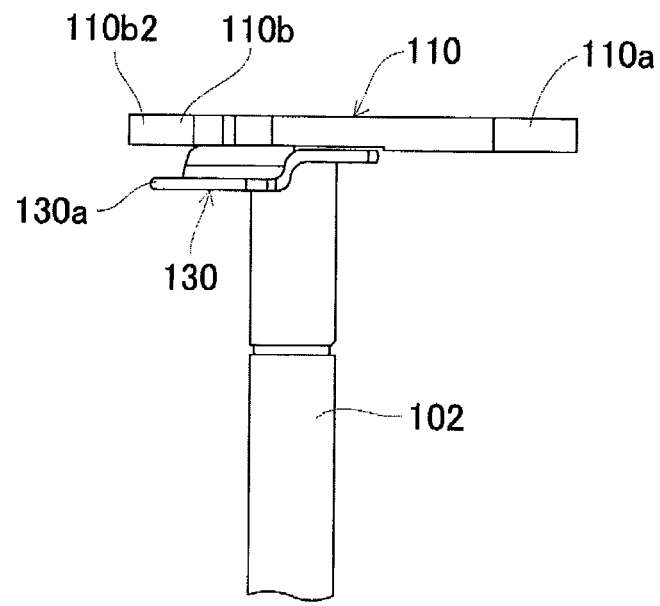
FIG. 6 is an enlarged side view of the second shift shaft and a shift arm shown in FIG. 2.
Figure 7:
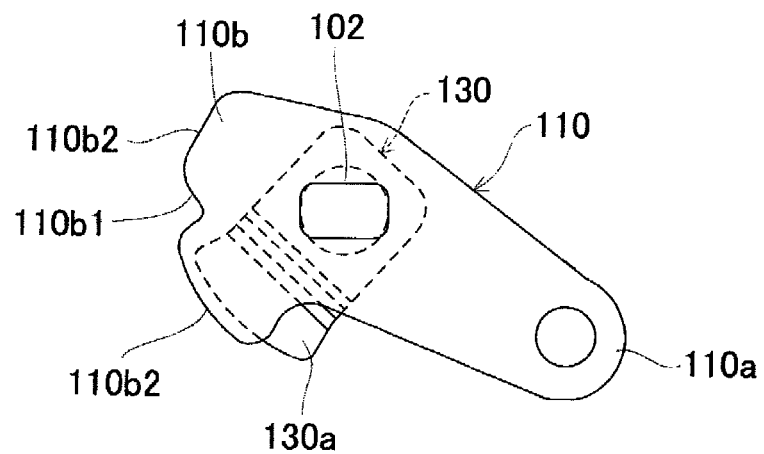
FIG. 7 is an enlarged plan view of the second shift shaft and shift arm shown in FIG. 6.

FIG. 6 is an enlarged side view of the second shift shaft 102 and shift arm 110 shown in FIG. 2 and FIG. 7 is an enlarged plan view of the second shift shaft 102 and shift arm 110 shown in FIG. 6.

The explanation will be made with reference to FIGS. 5 to 7. The operating point of the neutral switch 120 for producing an output (ON signal) is set in association with the rotation of the shift arm 110. To be specific, in the shift arm 110, its other end 110b positioned across the shift shaft 102 from its one end 110a has a substantially circular cam shape as viewed from the top. A plate 124 (only shown in FIG. 5) is disposed to face the other end 110b of the shift arm 110.

One end 124a of the plate 124 is fixed at an appropriate position of the outboard motor 10 and the other end 124b thereof is positioned so that it can make contact with (abut on) the neutral switch 120. A projection (convex) 124c is formed in the center of the plate 124 to face the other end 110b of the shift arm 110. The plate 124 comprises a sheet spring (elastic material) and is configured so that the projection 124c is pressed toward the other end 110b of the shift arm 110. As a result, the projection 124c is always in contact with the other end 110b.

The other end 110b of the shift arm 110 is formed with a recess 110b1 that can engage with the projection 124c. The remaining portion (substantially-circular portion) of the other end 110b other than the recess 110b1 is hereinafter called the "first circular arc" and assigned by symbol 110b2.

The recess 110b1 is formed at a position that enables the engagement with the projection 124c at the time when the rotational angle (rotational position) of the second shift shaft 102 is within a range indicative of the neutral position (e.g., when it is in the condition indicated by the solid lines in FIG. 5). On the other hand, the layout is defined so that the projection 124c does not engage with the recess 110b1, i.e., so that the projection 124c contacts the first circular arc 110b2 of the other end 110, at the time when the rotational angle of the second shift shaft 102 is out of the range indicative of the neutral position, more exactly, it is within a range indicative of the forward or reverse position (e.g., when it is in the condition indicated by the alternate long and short dashed lines or the alternate long and two short dashed lines in FIG. 5).

With the above configuration, when the second shift shaft 102 is rotated in response to the shift lever manipulation by the operator and the rotational angle thereof is within the range indicative of the neutral position, the projection 124c of the plate 124 engages with the recess 110b1 of the other end 110b and it makes the other end 124b of the plate 124 move further downward (on plane of paper) to establish contact with the neutral switch 120, whereby the neutral switch 120 produces the ON signal.

When the rotational angle of the second shift shaft 102 is within the range indicative of a position other than the neutral position, since the projection 124c is brought into contact with the first circular arc 110b2, the other end 124b of the plate 124 is moved backward as indicated by the alternate long and short dashed lines in FIG. 5 and consequently, it has no contact with the neutral switch 120, whereby the neutral switch 120 does not produce the output (ON signal), i.e., is made OFF. Thus the shift arm 110 also functions as a cam used for operating the neutral switch 120.

Figure 8:
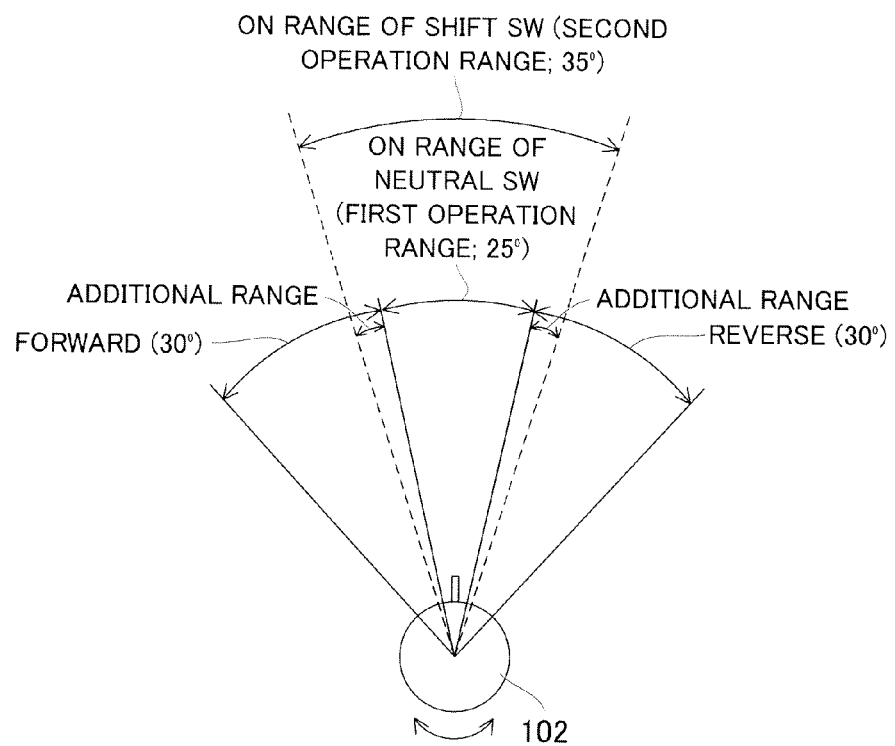
FIG. 8 is an explanatory view for explaining operation ranges (ON ranges) in which a neutral switch and shift switch shown in FIG. 5 output ON signals.

FIG. 8 is an explanatory view for explaining operation ranges (ON ranges) in which the neutral switch 120 and shift switch 122 output the ON signals. It should be noted that, in FIG. 8, the second shift shaft 102 is provided with a protrusion for ease of understanding of the rotational angle (rotational position) and the protrusion does not exist in fact.

As shown in FIG. 8, the range of the rotational angle of the second shift shaft 102 indicative of the neutral position, i.e., the range in which the neutral switch 120 outputs the ON signal, is defined as the "first operation range" and set to about 25 degrees. The second shift shaft 102 is designed to be rotatable in a range defined by adding about 30 degrees on both sides of the first operation range indicative of the neutral position, exactly, in a range of about 85 degrees that includes about 30 degrees on the forward side and about 30 degrees on the reverse side.

The explanation on the shift switch 122 will be made with reference to FIGS. 5 to 7. The operating point of the shift switch 122 for producing an output (ON signal) is set in association with the operation of a cam 130 that is provided for switching the shift position. The cam 130 is installed under the shift arm 110 of the second shift shaft 102 to be coaxially therewith.

To be specific, the cam 130 is fixed to the second shift shaft 102 and formed with a second circular arc 130a having a substantially circular shape as viewed from the top. A switch section 122a is located near the second circular arc 130a and upon being contacted with (pressed by) the circular arc 130a, operates the shift switch 122 to output the ON signal.

The second circular arc 130a is designed so that it contacts the switch section 122a when the rotational angle of the second shift shaft 102 is within a second operation range including the first operation range and additional ranges successively added on the both sides thereof.

The second operation range will be explained with reference to FIG. 8. The first operation range is added at its both sides with the additional ranges, each of which is 5 degrees for instance, and a total of the first operation range (25 degrees) and additional ranges (5 degrees each), i.e., the range of 35 degrees in total is defined as the "second operation range."

As a result, when the second shift shaft 102 is rotated in response to the manipulation of the shift lever by the operator and its rotational angle is within the second operation range, the second circular arc 130a of the cam 130 contacts (presses) the switch section 122a of the shift switch 122, so that the shift switch 120 produces the ON signal. In contrast, when the rotational angle is out of the second operation range, the second circular arc 130a of the cam 130 does not make contact with the switch section 122a of the shift switch 122 and the shift switch 122 produces no output (no ON signal), i.e., is made OFF, accordingly.

As mentioned in the foregoing, the neutral switch 120 produces the outputs when the rotational angle of the second shift shaft 102 is within the first operation range indicative of the neutral position, while the shift switch 122 produces the outputs when the rotational angle of the second shift shaft 102 is within the second operation range including the first operation range and the additional ranges successively added to the both sides of the first operation range.

As shown in FIG. 3, a throttle opening sensor 132 is installed near the throttle valve 54 to produce an output or signal indicative of a throttle opening TH [degree]. Another throttle opening sensor 134 is installed near the secondary air flow rate regulating valve 62 to produce an output or signal indicative of an opening thereof. A crank angle sensor 136 is disposed near the crankshaft 74 of the engine 44 and produces a pulse signal at every predetermined crank angle. The aforementioned outputs of the switches and sensors are sent to the ECU 26.

Based on the received sensor outputs, the ECU 26 controls the operation of the steering motor 40 to steer the outboard motor 10. Further, based on the received sensor outputs and switch outputs, the ECU 26 controls the operations of the throttle motor 56 and secondary air flow rate regulating motor 64 to open and close the throttle valve 54 and secondary air flow rate regulating valve 62, thereby regulating the flow rate of sucked air.

Furthermore, based on the sensor outputs and switch outputs, the ECU 26 determines the fuel injection amount and ignition timing of the engine 44, so that fuel of the determined fuel injection amount is supplied through the injector 66 and the air-fuel mixture composed of the injected fuel and intake air is ignited by an ignition device 140 (shown in FIG. 3) at the determined ignition timing.

Thus, the outboard motor control apparatus according to the embodiments is a Drive-By-Wire type apparatus whose operation system (steering wheel 16, shift lever 22) has no mechanical connection with the outboard motor 10, except the configuration related to the shift position change.

Figure 9:
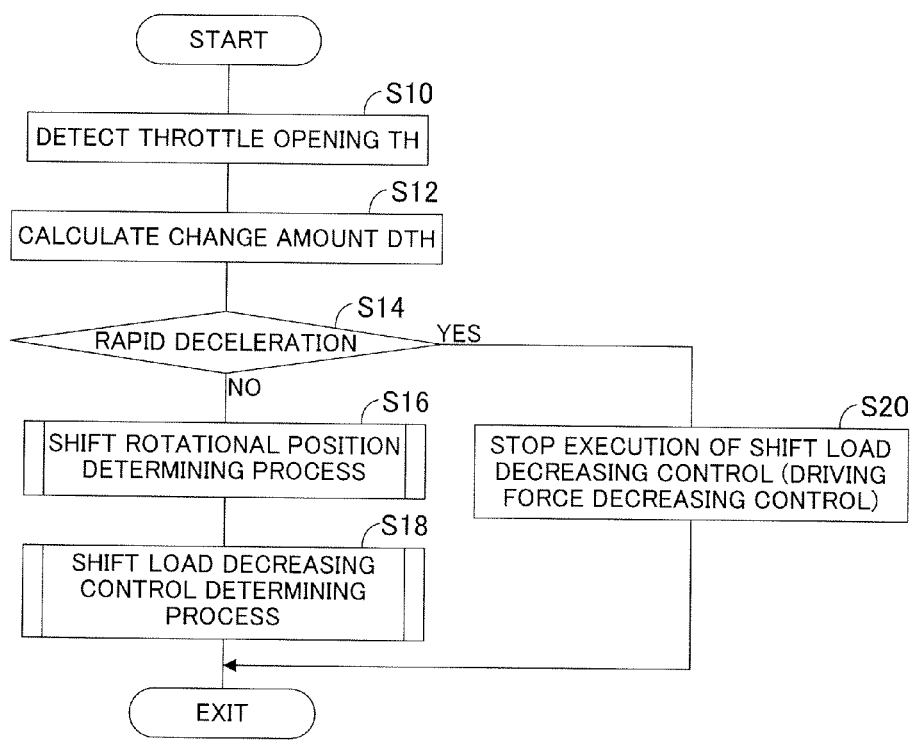
FIG. 9 is a flowchart showing an engine control operation executed by an ECU shown in FIG. 1.

FIG. 9 is a flowchart showing the engine control operation by the ECU 26. The illustrated program is executed at predetermined intervals, e.g., 100 milliseconds.

The program begins at S10 in which the throttle opening TH is detected or calculated from the output of the throttle opening sensor 132. The program proceeds to S12, in which a change amount DTH of the detected throttle opening TH per a predetermined time period (e.g., 500 milliseconds) is calculated.

Next the program proceeds to S14, in which it is determined whether the deceleration (more precisely, rapid deceleration) is instructed to the engine 44 by the operator, i.e., whether the engine 44 is in the operating condition to (rapidly) decelerate the boat 1, when the shift position is forward. This determination is made based on the output of the lever position sensor 24 and by checking as to whether the throttle valve 54 is rapidly operated in the closing direction.

Specifically, when the output indicating that the shift lever 22 is in the forward position is outputted by the lever position sensor 24, the throttle opening change amount DTH calculated in S12 is compared to a prescribed value DTHa used for deceleration determination and when the change amount DTH is equal to or less than the prescribed value DTHa, it is discriminated that the throttle valve 54 is rapidly operated in the closing direction, i.e., the rapid deceleration is instructed. The prescribed value DTHa (negative value) is set as a criterion for determining whether the rapid deceleration is instructed, e.g., −20 degrees.

When the result in S14 is negative, the program proceeds to S16, in which a shift rotational position determining process for determining the present rotational angle of the second shift shaft 102, i.e., the rotational position thereof (hereinafter sometimes called the "shift rotational position") in the present program loop, is performed.

Figure 10:
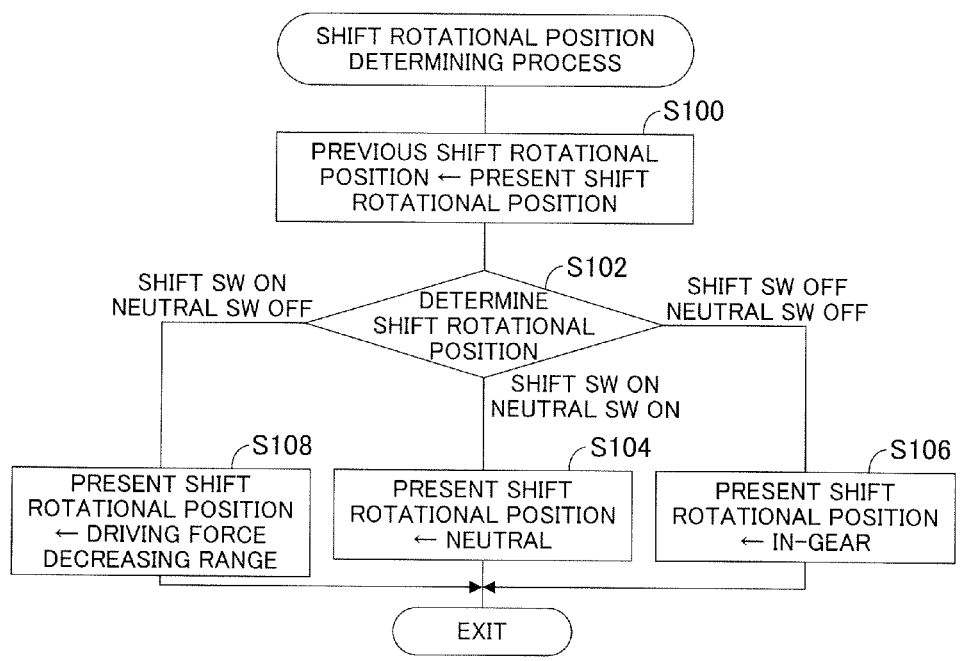
FIG. 10 is a subroutine flowchart showing a shift rotational position determining process shown in FIG. 9.

FIG. 10 is a subroutine flowchart showing the process. As illustrated, in S100, a present shift rotational position (described later) set in the previous program loop is defined as a previous shift rotational position, i.e., the previous shift rotational position is updated.

Next the program proceeds to S102, in which the rotational position of the second shift shaft 102 is determined based on the outputs of the neutral switch 120 and shift switch 122. Specifically, when the neutral switch 120 and shift switch 122 both produce the outputs (ON signals), it is discriminated that the rotational position of the shift shaft 102 (i.e., the rotational position (angle) of the protrusion of the shift shaft 102 shown in FIG. 8) is within the first operation range and the shift position is in the neutral position. Then the program proceeds to S104, in which the present shift rotational position is set as the "neutral."

When, in S102, the neutral switch 120 and shift switch 122 both produce no output, i.e., are both made OFF, it is discriminated that the rotational position of the shift shaft 102 is out of the second operation range and the shift position is in the in-gear position, and the program proceeds to S106, in which the present shift rotational position is set as the "in-gear."

Further, when the shift switch 122 produces the output (ON signal) and the neutral switch 120 produces no output, the rotational position of the shift shaft 102 is determined to be within the additional ranges shown in FIG. 8 and the program proceeds to S108, in which the present shift rotational position is set as a "driving force decreasing range." It is called the "driving force decreasing range" because, when the shift shaft 102 is within the additional ranges, there may be a need to perform shift load decreasing control to decrease the driving force of the engine 44 for mitigating load on the operator caused by the shift lever manipulation, as described later.

Returning to the explanation on FIG. 9, the program proceeds to S18, in which a shift load decreasing control determining process is conducted for determining whether the shift load decreasing control is to be performed.

Figure 11:
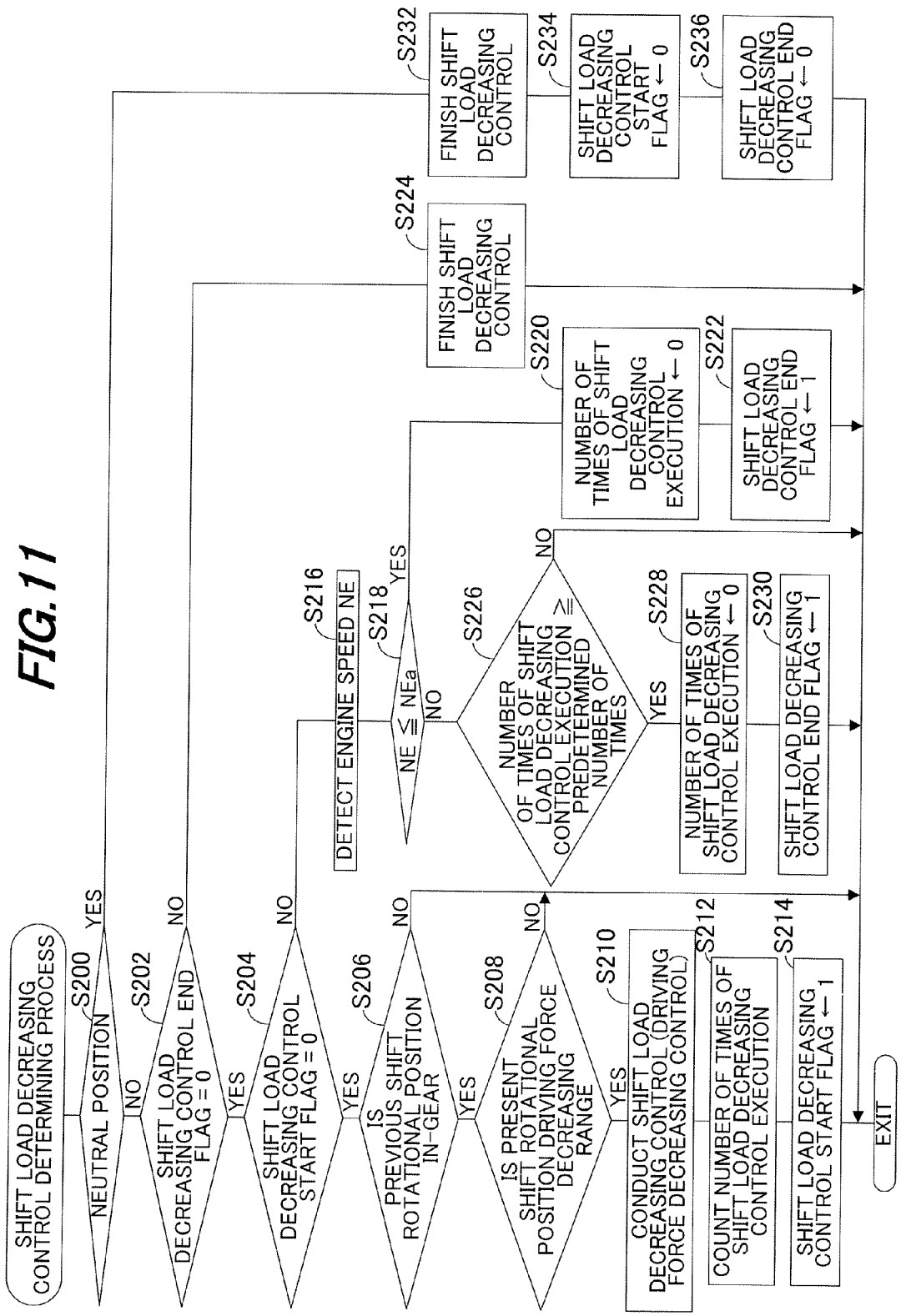
FIG. 11 is a subroutine flowchart showing a shift load decreasing control determining process shown in FIG. 9.

FIG. 11 is a subroutine flowchart showing the process.

As shown in FIG. 11, in S200, it is determined based on the output of the neutral switch 120 whether the present shift position is in the neutral position. When the result in S200 is negative, the program proceeds to S202, in which it is determined whether the bit of a shift load decreasing control end flag (described later) is 0.

Since the initial value of this flag is 0, the result in S202 in the first program loop is generally affirmative and the program proceeds to S204, in which it is determined whether the bit of a shift load decreasing control start flag (described later) is 0.

Since the initial value of this flag is also 0, the result in S204 in the first program loop is generally affirmative and the program proceeds to S206, in which it is determined whether the previous shift rotational position is the in-gear, i.e., whether the shift position in the previous program loop is in the forward or reverse position.

When the result in S206 is negative, the remaining steps are skipped, while when the result is affirmative, the program proceeds to S208, in which it is determined whether the present shift rotational position is the driving force decreasing range. When the result in S208 is negative, the program is terminated, while when the result is affirmative, i.e., when the shift lever 22 is manipulated by the operator so that the shift rotational position is changed from the in-gear to the driving force decreasing range (in other words, when the neutral operation in which the shift position is switched from the in-gear position to the neutral position is detected based on the outputs of the neutral switch 120 and shift switch 122), the program proceeds to S210, in which the shift load decreasing control (sometimes called the "driving force decreasing control") to decrease the driving force of the engine 44 for mitigating load on the operator caused by manipulation of the shift lever 22, is conducted or started.

To be more specific, in S210, the ignition is cut off, the ignition timing is retarded, or the fuel injection amount is decreased in the engine 44, i.e., at least one of those operations is conducted, to decrease the driving force of the engine 44, more specifically, to change the engine speed NE so as to gradually decrease it. Consequently, it makes easy to release the engagement of the clutch 94 with the forward or reverse gear 90 or 92, thereby mitigating load on the operator caused by the shift lever manipulation.

Note that, in S210, in the case of the ignition cut or the retard of ignition timing, it is carried out from a cylinder associated with the next ignition, while in the case of the decrease of fuel injection amount, it is carried out from a cylinder associated with the next injection.

Next the program proceeds to S212, in which the number of times that the shift load decreasing control through the ignition cut or the like is executed is counted, and to S214, in which the bit of the shift load decreasing control start flag is set to 1. Specifically, the bit of this flag is set to 1 when the shift load decreasing control is started and otherwise, reset to 0.

In a program loop after the bit of the shift load decreasing control start flag is set to 1, the result in S204 is negative and the program proceeds to S216. In S216, the output pulses of the crank angle sensor 136 are counted to detect or calculate the engine speed NE and then in S218, it is determined whether the detected engine speed NE is equal to or less than a limit value (stall limit engine speed NEa; lower limit value; predetermined engine speed) with which the engine 44 can avoid a stall. The stall limit engine speed NEa is set the same as a threshold value used for determining whether a starting mode should be switched to a normal mode in the normal operation control of the engine 44, more exactly, set to 500 rpm.

When the result in S218 is affirmative, the program proceeds to S220, in which a counter value indicating the number of times of the shift load decreasing control execution is reset to 0, and to S222, in which the bit of the shift load decreasing control end flag is set to 1.

When the bit of this flag is set to 1, the result in S202 in the next program loop becomes negative and the program proceeds to S224, in which the shift load decreasing control is finished. Specifically, when the engine speed NE is equal to or less than the stall limit engine speed NEa, if the shift load decreasing control, i.e., the control to decrease the driving force of the engine 44 through the ignition cut-off, etc., is continued, it may cause a stall of the engine 44. Therefore, in this case, the shift load decreasing control is stopped regardless of the shift rotational position.

On the other hand, when the result in S218 is negative, the program proceeds to S226, in which it is determined whether the number of times of the shift load decreasing control execution is equal to or greater than a predetermined number of times (described later). When the result in S226 is negative, the remaining steps are skipped, while when the result is affirmative, the program proceeds to S228, in which the counter value indicating the number of times of the shift load decreasing control execution is reset to 0, and to S230, in which the bit of the shift load decreasing control end flag is set to 1. Consequently, the result in S202 in the next program loop becomes negative and the program proceeds to S224, in which the shift load decreasing control is finished.

The processing of S226 to S230 is conducted for preventing the shift load decreasing control (driving force decreasing control) from being executed for a long time. Specifically, depending on movement of the shift lever 22, for example when the shift lever 22 is slowly manipulated, the rotational position of the second shift shaft 102 may remain in the driving force decreasing range for a relatively long time. In this case, if the control such as the ignition cut-off is continued, it could make the operation of the engine 44 (combustion condition) unstable, i.e., the engine speed NE unstable, disadvantageously.

Therefore, the apparatus according to this embodiment is configured to finish (stop) the control when it is discriminated that the load on the operator caused by the shift lever manipulation has been sufficiently mitigated through the control (more exactly, when about two seconds have elapsed since the control start). The predetermined number of times is set as a criterion for determining whether the load on the operator caused by the shift lever manipulation is sufficiently mitigated and also determining that the engine 44 operation may become unstable when the ignition cut-off, etc., is executed more times than this value, e.g., set to 10 times.

When the shift lever 22 is manipulated by the operator and the switching of the shift position to the neutral position is completely done, the result in S200 is affirmative and the program proceeds to S232, in which the shift load decreasing control is finished and to S234 and S236, in which the bits of the shift load decreasing control start flag and shift load decreasing control end flag are both reset to 0, whereafter the program is terminated. Note that, when the shift position is in the neutral position, the operations of the throttle motor 56 and secondary air flow rate regulating motor 64 are controlled in another program (not shown) so that the engine speed NE is maintained at the idling speed.

Returning to the explanation on FIG. 9, when the result in S14 is affirmative, the program proceeds to S20, in which the execution of the shift load decreasing control is stopped, i.e., when the deceleration (precisely, the rapid deceleration) is instructed to the engine 44 by the operator with the shift position being in the forward position, the above control is not conducted.

Figure 12:
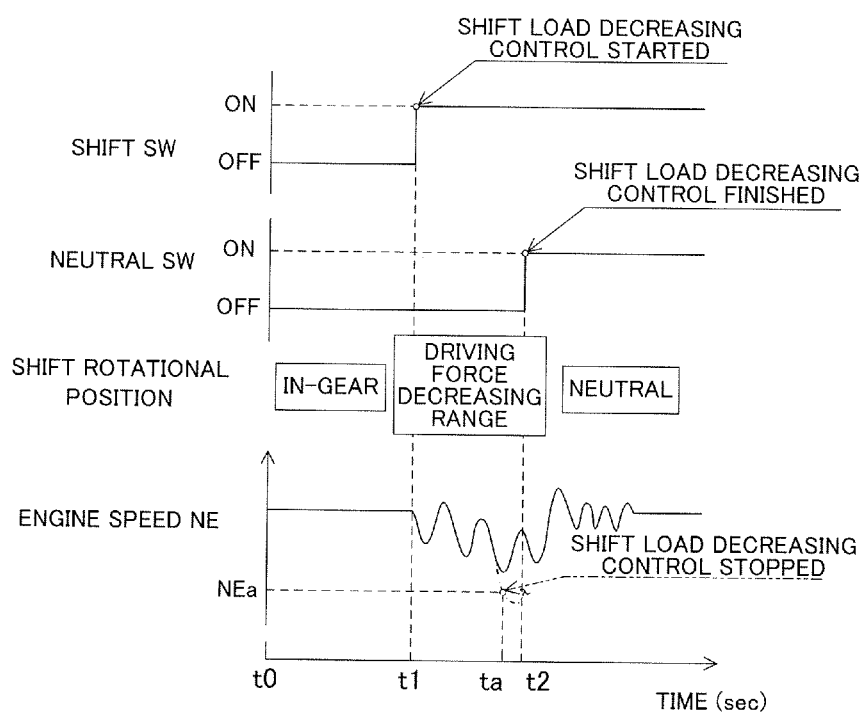
FIG. 12 is a time chart for explaining a part of the processes in FIGS. 9 to 11.

FIG. 12 is a time chart for explaining a part of the foregoing processes in FIGS. 9 to 11. FIG. 12 shows the case where the shift rotational position is moved from the forward (in-gear), via the driving force decreasing range, to the neutral.

As shown in FIG. 12, during the time t0 to t1, since the neutral switch 120 and shift switch 122 both produce no output (i.e., are both made OFF), the rotational position of the second shift shaft 102 is determined to be the in-gear (S106).

When the shift lever 22 is manipulated from the forward to the neutral and, at the time t1, the shift rotational position is moved from the in-gear to the driving force decreasing range so that the shift switch 122 is made ON and the neutral switch 120 remains OFF, i.e., when the neutral operation is detected, the shift load decreasing control for decreasing the driving force of the engine 44 is started (S108, S206 to S210). As a result, the engine speed NE is changed and gradually decreased. Consequently, it makes easy to release the engagement of the clutch 94 with the forward gear 90, thereby mitigating the load on the operator caused by the shift lever manipulation.

Next the shift lever 22 is further manipulated to the neutral. When, at the time t2, the shift rotational position is moved from the driving force decreasing range to the neutral and the neutral switch 120 and shift switch 122 both produce the outputs (ON signals), the shift load decreasing control is finished (S200, S232).

As indicated by the imaginary lines in FIG. 12, in the case where, for instance, the engine speed NE is decreased to a value at or below the stall limit engine speed NEa during the period of the time t1 to t2 after execution of the shift load decreasing control, the shift load decreasing control is stopped (S218, S222, S224). Aside from that, although not illustrated, when the number of times of the shift load decreasing control execution becomes equal to or greater than the predetermined number of times before the shift rotational position reaches the neutral from the driving force decreasing range, also the shift load decreasing control is stopped (S226, S230, S224).

As mentioned in the foregoing, in the first embodiment, in an outboard motor (10) having a shift shaft (second shift shaft 102) to be rotated in response to manipulation by an operator to switch a shift position between an in-gear position that enables driving force of a prime mover (engine 44) to be transmitted to a propeller (82) by engaging a clutch (94) with one of a forward gear (90) and a reverse gear (92), and a neutral position that cuts off transmission of the driving force by disengaging the clutch from the forward or reverse gear, it is configured to have a neutral operation detector (neutral switch 120, shift switch 122, ECU 26, S16, S18, S100 to S108, S206, S208) connected to the shift shaft and adapted to detect a neutral operation in which the shift position is switched from the in-gear position to the neutral position; and a driving force controller (ECU 26, S18, S210) adapted to conduct driving force decreasing control to decrease the driving force of the prime mover when the neutral operation is detected.

With this, it becomes possible to decrease the driving force of the engine 44 at the right timing with the simple structure, thereby mitigating the load on the operator caused by the shift lever manipulation. Specifically, it becomes possible to detect the neutral operation using the neutral operation detector connected to the second shift shaft 102 and since the driving force decreasing control is started when the neutral operation is detected, it makes easy to release the engagement of the clutch 94 with the forward or reverse gear 90 or 92 (in-gear condition), thereby mitigating the shift lever manipulation load.

Further, since the driving force of the engine 44 is decreased at the right timing, it can avoid unnecessary driving force decreasing control, so that the engine speed (idling speed) after the shift position is switched to the neutral position can be stable.

In the apparatus, the neutral operation detector comprises a neutral switch (120) adapted to produce an output when a rotational angle of the shift shaft is within a first operation range indicative of the neutral position; and a shift switch (122) adapted to produce an output when the rotational angle of the shift shaft is within a second operation range including the first operation range and additional ranges successively added to both sides of the first operation range, and detects the neutral operation based on the outputs of the neutral switch and the shift switch (S16, S18, S100 to S108, S206, S208).

With this, it becomes possible to detect the switching timing of the shift position from the in-gear position to the neutral position (i.e., the neutral operation) based on the outputs of the neutral switch 120 and shift switch 122 and since the driving force decreasing control is started when the neutral operation is detected, it makes easy to release the engagement of the clutch 94 with the forward or reverse gear 90 or 92 (in-gear condition). Therefore, the shift lever manipulation load on the operator can be reliably mitigated with the simple structure. Further, since the operation ranges of the neutral and shift switches 120, 122 are determined based on the rotational angle of the shift shaft 102, their operating points can be easily and appropriately set.

In the apparatus, the neutral operation detector determines that the neutral operation is conducted when the shift switch (122) produces the output while the neutral switch (120) produces no output. With this, it becomes possible to accurately detect the switching timing of the shift position from the in-gear position to the neutral position (i.e., the neutral operation) and the driving force decreasing control can be started at the more suitable timing.

In the apparatus, the prime mover (44) comprises an internal combustion engine (44) and the driving force controller decreases the driving force of the prime mover by conducting at least one of ignition cut-off, ignition timing retarding and decrease of a fuel injection amount in the engine. With this, the driving force of the prime mover 44 can be reliably decreased, thereby mitigating the load on the operator caused by the shift lever manipulation.

In the apparatus, the neutral switch (120) and the shift switch (122) are positioned to be able to contact with a can (shift arm 110, cam 130) installed coaxially with the shift shaft (102) and produce the outputs upon contacting with the cam. With this, the structures of the neutral switch 120 and shift switch 122 can be further simple.

In the apparatus, the prime mover (44) comprises an internal combustion engine (44), and the apparatus further includes: a driving force decreasing control stopper (ECU 26, S18, S218 to S230) adapted to stop the driving force decreasing control when a speed (NE) of the engine becomes equal to or less than a predetermined engine speed (stall limit engine speed NEa) after the driving force decreasing control is conducted or when the driving force decreasing control is conducted a predetermined number of times or more.

With this, even when, for instance, the shift lever 22 is slowly manipulated from the in-gear position to the neutral position, the driving force decreasing control can be stopped before the engine 44 operation becomes unstable, i.e., it makes possible to avoid longer execution of the driving force decreasing control than necessary. Specifically, the driving force decreasing control can be appropriately conducted, while avoiding unstable operation of the engine 44.

The apparatus further includes a deceleration instruction determiner (throttle opening sensor 132, ECU 26, S14)

adapted to determine whether deceleration is instructed to the engine (44) by the operator; and a driving force decreasing control stopper (ECU 26, S20) adapted to stop the driving force decreasing control when the deceleration is determined to be instructed. With this, it becomes possible to prevent occurrence of so-called water hammer that may be caused by suction of water through the exhaust pipe 78.

To be more specific, in the case where the shift lever 22 is swiftly manipulated toward the reverse position (i.e., the (rapid) deceleration is instructed to the engine 44) with the shift position in the forward position (with the clutch 94 engaged with the forward gear 90), if the driving force decreasing control is executed at that time, it makes easy to release the engagement with the forward gear 90 (in-gear condition) and accordingly, the shift position is rapidly changed from the forward position to the reverse position at once. In this case, the clutch 94 is sometimes engaged with the reverse gear 92 with the propeller 82 still rotating in the forward direction and it may lead to the reverse rotation of the engine 44, so that water is sucked through the exhaust pipe 78. As a result, the water hammer occurs and it may give damages to the engine 44. However, since this embodiment is configured to stop (or not to conduct) the driving force decreasing control as mentioned above, the engagement with the forward gear 90 is not easily released and it makes possible to delay the timing of shift position change to the reverse position, thereby preventing occurrence of the water hammer.

An outboard motor control apparatus according to a second embodiment will be next explained.

The explanation of the second embodiment will focus on the points of difference from the first embodiment. Specifically, in the case where, for example, the shift position becomes the neutral position and then, again becomes the in-gear position immediately after the driving force decreasing control is finished, the load may act on the engine 44 with the engine operation remaining unstable. Since it could cause the engine stall or other disadvantageous event, the second embodiment is configured to prevent it.

Figure 13:
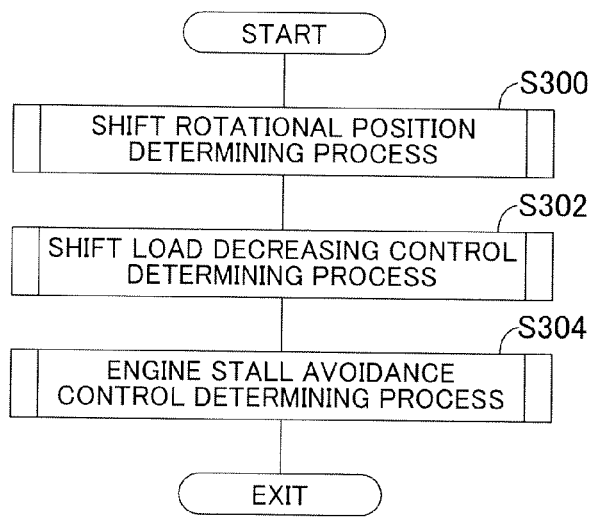
FIG. 13 is a flowchart showing an engine control operation executed by an ECU of an outboard motor control apparatus according to a second embodiment of the invention.

FIG. 13 is a flowchart showing the engine control operation by the ECU 26. In place of the FIG. 9 flowchart, the illustrated program is executed at predetermined intervals, e.g., 100 milliseconds.

The program begins at S300, in which a shift rotational position determining process is conducted similarly to that of S16 in FIG. 9 in the first embodiment.

Figure 14:
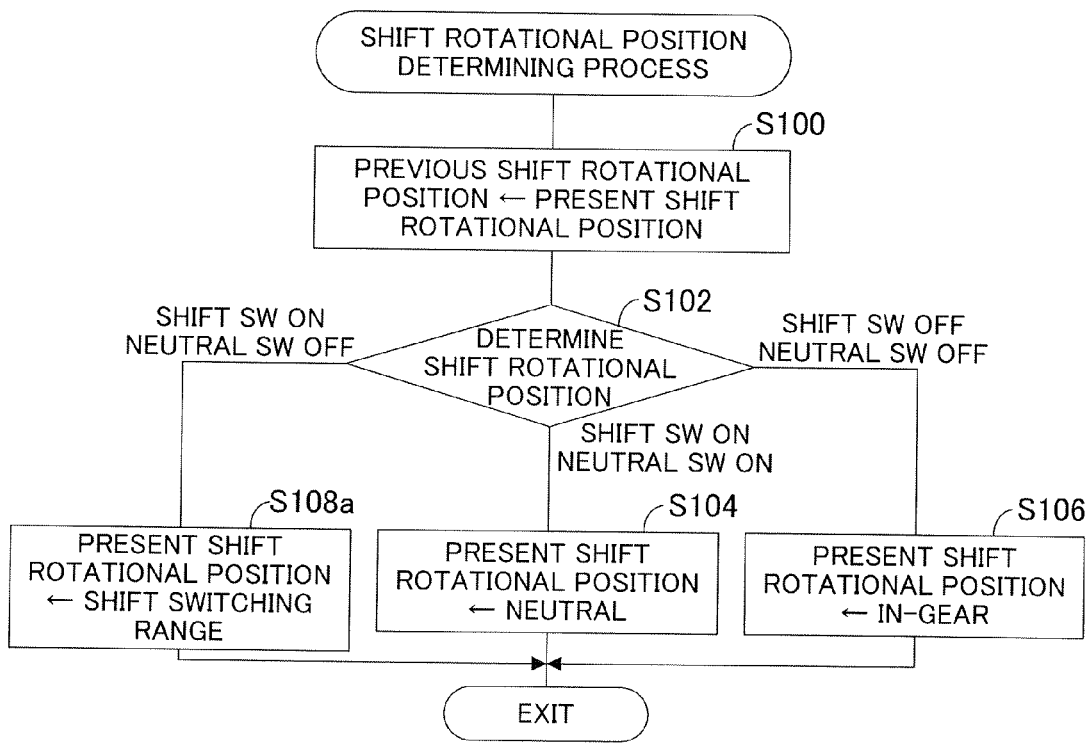
FIG. 14 is a subroutine flowchart similar to FIG. 10, but showing a shift rotational position determining process shown in FIG. 13.

FIG. 14 is a subroutine flowchart showing the process, similarly to FIG. 10. In S108 in the first embodiment, the present shift rotational position is called the "driving force decreasing range," while in S108a in the second embodiment, the present shift rotational position is called a "shift switching range." It is called the "shift switching range" because this embodiment is configured to not only decrease but also, in some cases, increase the driving force of the engine 44 when the shift rotational position is within the additional ranges, as described later; and discriminate that the shift position is in the process of being switched from the in-gear position to the neutral position or vice versa based on the fact that the shift position is within the additional ranges.

Other than the above point, the FIG. 14 flowchart is the same as the FIG. 10 flowchart.

Returning to the explanation on FIG. 13, the program proceeds to S302, in which a shift load decreasing control determining process is conducted for determining whether the shift load decreasing control is to be performed.

Figure 15:
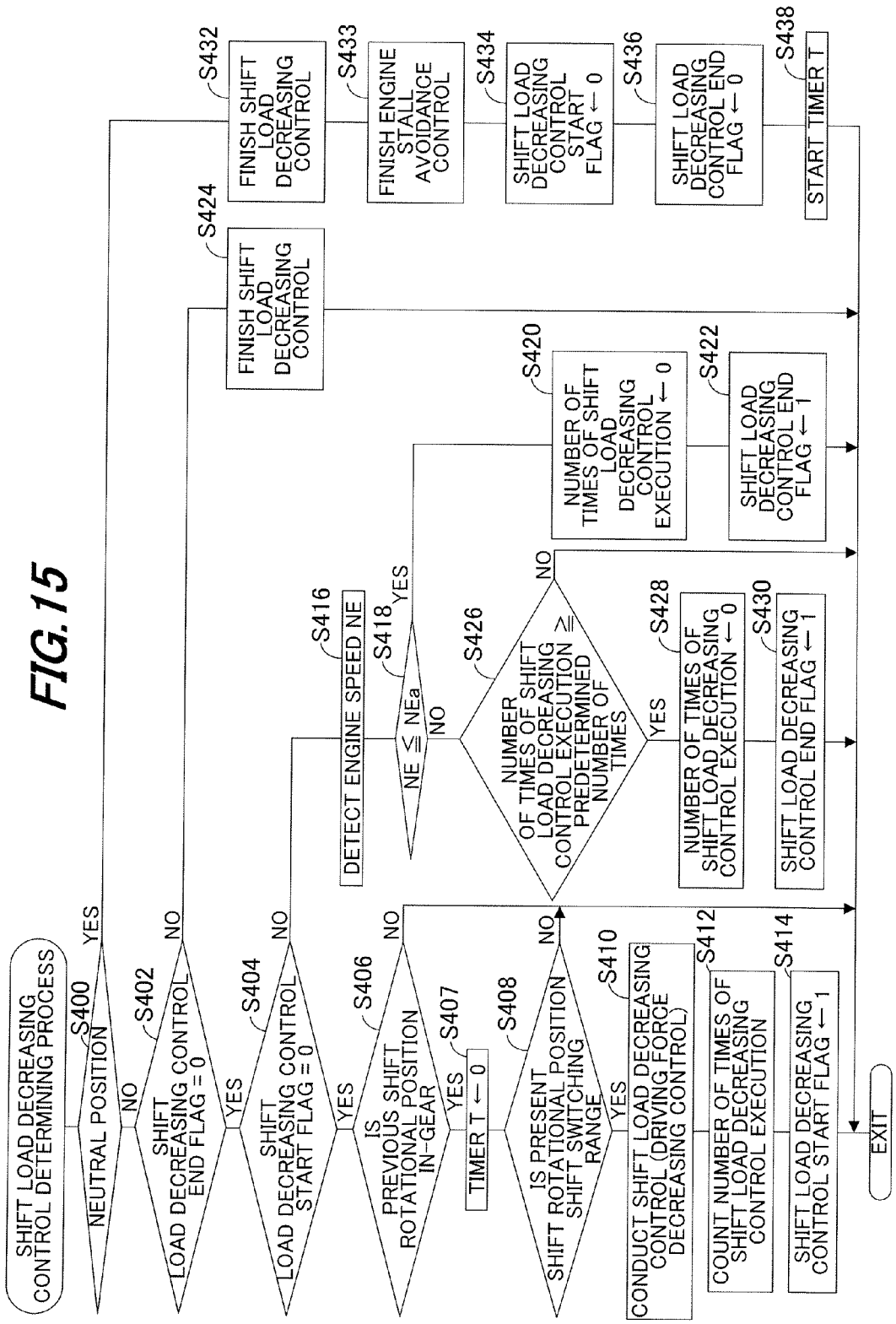
FIG. 15 is a subroutine flowchart similar to FIG. 11, but showing a shift load decreasing control determining process shown in FIG. 13.

FIG. 15 is a subroutine flowchart showing the process.

The processing of S400 to S406 is conducted similarly to S200 to S206 of the FIG. 11 flowchart.

When the result in S406 is negative, the remaining steps are skipped and when the result is affirmative, the program proceeds to S407, in which a value of a timer T (described later) is reset to 0 and to S408, in which it is determined whether the present shift rotational position is in the shift switching range. When the result in S408 is negative, the program is terminated, while when the result is affirmative, i.e., when the shift lever 22 is manipulated by the operator so that the shift rotational position is changed from the in-gear to the shift switching range, the program proceeds to S410, and up to S432, the processing is conducted similarly to S210 to S232 of the FIG. 11 flowchart.

After the shift load decreasing control (driving force decreasing control) is finished in S432, the program proceeds to S433, in which engine stall avoidance control (described later) is finished.

Next the program proceeds to S434 and S436, in which the bits of the shift load decreasing control start flag and shift load decreasing control end flag are both reset to 0 so that the program is terminated, and to S438, in which the timer T is started. The timer T is used for measuring the elapsed time since the shift position is changed to the neutral position and the shift load decreasing control (driving force decreasing control) is finished.

Returning to the explanation on FIG. 13, the program proceeds to S304, in which an engine stall avoidance control determining process is conducted for determining whether the engine stall avoidance control to increase the decreased driving force of the engine 44 for avoiding the engine stall is to be performed.

Figure 16:
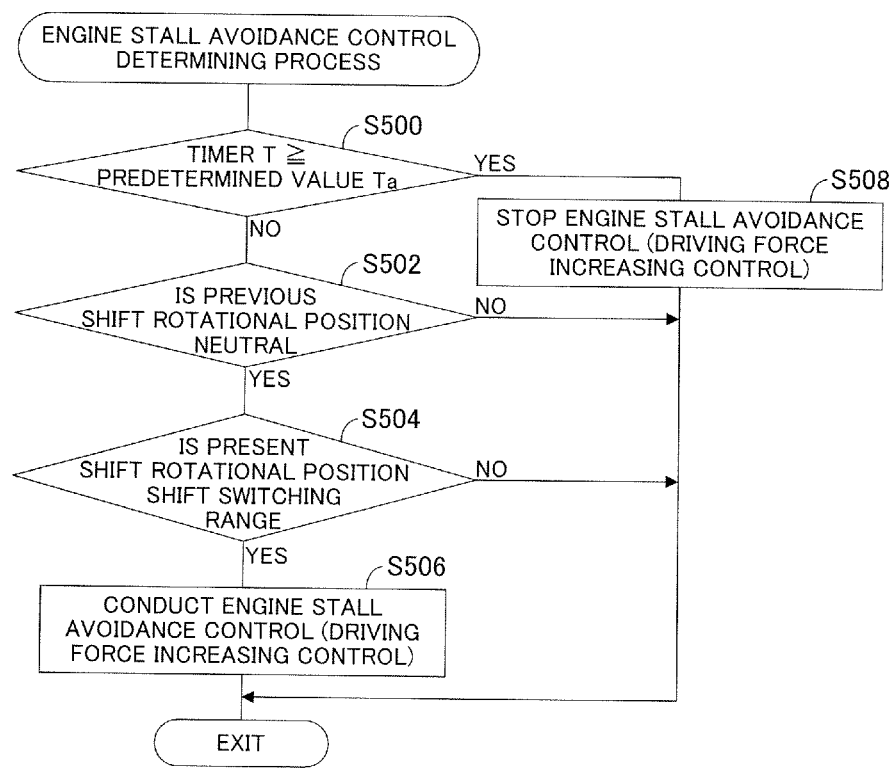
FIG. 16 is a subroutine flowchart showing an engine stall avoidance control determining process shown in FIG. 13.

FIG. 16 is a subroutine flowchart showing the process.

As shown in FIG. 16, in S500, it is determined whether the timer T value is equal to or greater than a predetermined value Ta. This predetermined value Ta is set to a value indicating a time period to be taken until the operation of the engine 44 which is temporarily unstable due to the foregoing driving force decreasing control is restored after the control is finished and becomes stable (for example, until the engine speed NE becomes stable at the idling speed), e.g., set to two seconds.

When the result in S500 is negative, the program proceeds to S502, in which it is determined whether the previous shift rotational position is neutral. When the result in S502 is affirmative, the program proceeds to S504, in which it is determined whether the present shift rotational position is in the shift switching range.

When the result in S502 or S504 is negative, the remaining steps are skipped, while when the results of S502 and S504 are affirmative, i.e., when the shift lever 22 is manipulated by the operator so that the shift rotational position is changed from the neutral position to the shift switching range (in other words, when the in-gear operation in which the shift position is switched from the neutral position to the in-gear position is detected based on the outputs of the neutral switch 120 and shift switch 122), the program proceeds to S506, in which the engine stall avoidance control (sometimes called the "driving force increasing control") to increase the decreased driving force of the engine 44 is conducted.

To be specific, the processing of S506 is done by controlling the operation of the throttle motor 56 or the secondary air flow rate regulating motor 64 to regulate the opening of the throttle valve 54 or the secondary air flow rate regulating valve 62 so as to raise the intake air flow rate, thereby increasing the driving force of the engine 44, more specifically, thereby converging the engine speed NE to a value (e.g., 700 rpm) that can avoid the engine stall even if the load is applied to the engine 44 through the in-gear operation. In the case where, in S212, the driving force of the engine 44 is decreased by retarding the ignition timing, in S506, the ignition timing is advanced compared to the normal operation to increase the driving force.

When the result in S500 is affirmative, the program proceeds to S508, in which the aforementioned engine stall avoidance control, i.e., the control to increase the driving force of the engine 44 is stopped or not conducted. Specifically, when the elapsed time since the driving force decreasing control is finished reaches the predetermined value Ta, the control to increase the driving force is stopped (i.e., the driving force increasing control is not conducted) regardless of the shift rotational position (more exactly, even when the in-gear operation is detected).

Figure 17:
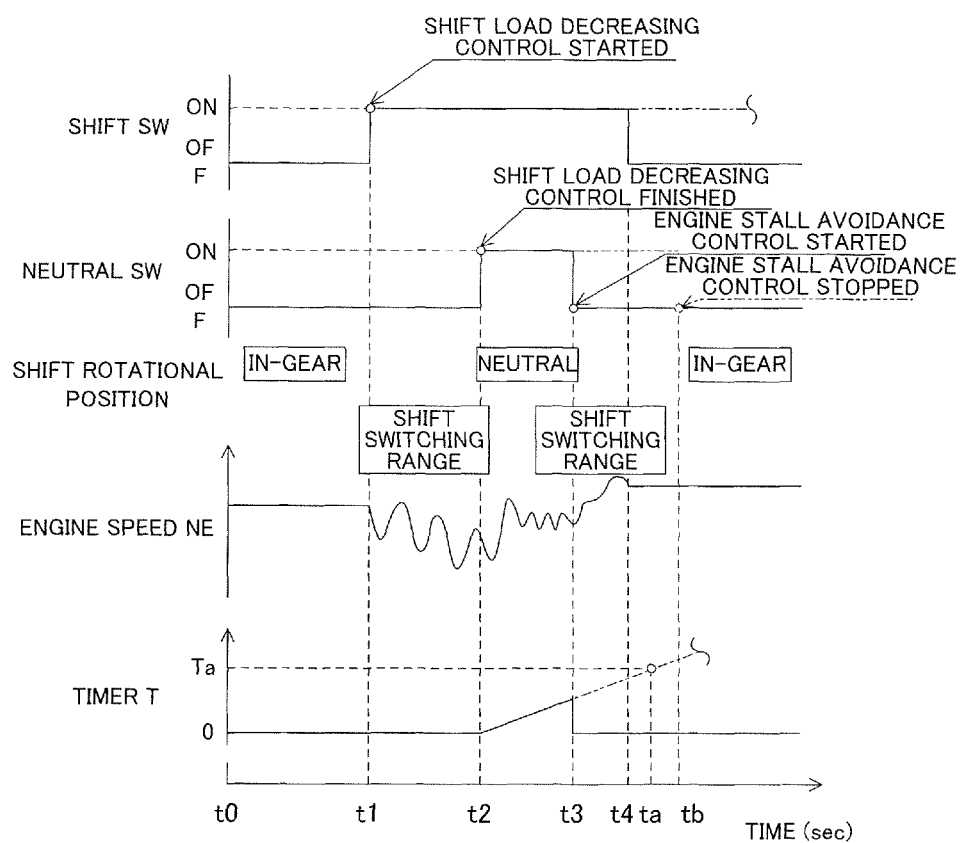
FIG. 17 is a time chart for explaining a part of the processes in FIGS. 13 to 16.

FIG. 17 is a time chart for explaining a part of the foregoing processes in FIGS. 13 to 16. FIG. 17 shows the case where the shift rotational position is moved from the forward (in-gear), via the shift switching range, to the neutral and subsequently, it is moved from the neutral, via the shift switching range, to the reverse (in-gear).

The explanation on the time t0 to t2 is omitted, as it is the same as in the first embodiment.

At the time t2, the timer T is started (S442). Immediately after that, when the shift lever 22 is manipulated from the neutral position to the reverse position so that, at the time t3, the shift rotational position is moved from the neutral to the shift switching range and the neutral switch 120 is solely made OFF, in other words, the in-gear operation is detected, the engine stall avoidance control to increase the decreased driving force is performed (S500 to S506). As a result, since the engine speed NE is gradually increased, even when the shift rotational position is completely switched to the in-gear so that the clutch 94 and reverse gear 92 are engaged and the load acts on the engine 44 at the time t4, the engine stall can be avoided.

As indicated by the imaginary lines in FIG. 17, in the case where the shift rotational position remains in the neutral position and the timer T value reaches the predetermined value Ta (the time ta) after the time t2, even if the shift lever 22 is subsequently manipulated to the reverse position and the in-gear operation is detected at the time tb, the engine stall avoidance control to increase the decreased driving force is not conducted (S500, S508).

As mentioned in the foregoing, the second embodiment is configured to include: an in-gear operation detector (neutral switch 120, shift switch 122, ECU 26, S300, S304, S100 to S108a, S502, S5504) adapted to detect an in-gear operation in which the shift position is switched from the neutral position to the in-gear position, and the driving force controller increases the decreased driving force when the in-gear operation is detected after the driving force decreasing control is finished (S304, S502 to S506).

With this, even when the shift position becomes the neutral position and then, again becomes the in-gear position immediately after the driving force decreasing control is finished (i.e., even when the load acts on the engine 44 immediately after the same), since the driving force of the engine 44 is increased in advance, the engine stall can be avoided or prevented.

The apparatus further includes a time measuring unit (timer T, ECU 26, S302, S438) adapted to measure elapsed time since the driving force decreasing control is finished, and the time measuring unit stops the driving force controller from increasing the driving force when the measured elapsed time reaches a predetermined value (Ta) even if the in-gear operation is detected (S304, S500, S508). With this, unnecessary increase in the driving force can be avoided.

Specifically, although the operating condition of the engine 44 becomes temporarily unstable due to the driving force decreasing control, once the elapsed time after the control is finished reaches the predetermined value Ta, the operating condition is restored and stabilized. Since it is not necessary to increase the driving force under such a stable condition, it is configured to stop the driving force controller from increasing the driving force even if the in-gear operation is detected, thereby avoiding unnecessary increase in the driving force.

The remaining configuration as well as the effects is the same as that in the first embodiment.

As stated above, the first and second embodiments are configured to have an apparatus for controlling operation of an outboard motor (10) having a shift shaft (second shift shaft 102) to be rotated in response to manipulation by an operator to switch a shift position between an in-gear position that enables driving force of a prime mover (engine 44) to be transmitted to a propeller (82) by engaging a clutch (94) with one of a forward gear (90) and a reverse gear (92), and a neutral position that cuts off transmission of the driving force by disengaging the clutch from the forward or reverse gear, comprising: a neutral operation detector (neutral switch 120, shift switch 122, ECU 26, S16, S18, S100 to S108, S206, S208, S300, S302, S100 to S108a, S406, S408) connected to the shift shaft and adapted to detect a neutral operation in which the shift position is switched from the in-gear position to the neutral position; and a driving force controller (ECU 26, S18, S210, S302, S410) adapted to conduct driving force decreasing control to decrease the driving force of the prime mover when the neutral operation is detected.

With this, it becomes possible to decrease the driving force of the engine 44 at the right timing with the simple structure, thereby mitigating the load on the operator caused by the shift lever manipulation. Specifically, it becomes possible to detect the neutral operation using the neutral operation detector connected to the second shift shaft 102 and since the driving force decreasing control is started when the neutral operation is detected, it makes easy to release the engagement of the clutch 94 with the forward or reverse gear 90 or 92 (in-gear condition), thereby mitigating the shift lever manipulation load.

Further, since the driving force of the engine 44 is decreased at the right timing, it can avoid unnecessary driving force decreasing control, so that the engine speed (idling speed) after the shift position is switched to the neutral position can be stable.

In the apparatus, the neutral operation detector comprises a neutral switch (120) adapted to produce an output when a rotational angle of the shift shaft is within a first operation range indicative of the neutral position; and a shift switch (122) adapted to produce an output when the rotational angle of the shift shaft is within a second operation range including the first operation range and additional ranges successively added to both sides of the first operation range, and detects the neutral operation based on the outputs of the neutral switch and the shift switch (S16, S18, S100 to S108, S206, S208, S300, S302, S100 to S108a, S406, S408).

With this, it becomes possible to detect the switching timing of the shift position from the in-gear position to the neutral position (i.e., the neutral operation) based on the outputs of the neutral switch 120 and shift switch 122 and since the driving force decreasing control is started when the neutral operation is detected, it makes easy to release the engagement of the clutch 94 with the forward or reverse gear 90 or 92 (in-gear condition). Therefore, the shift lever manipulation load on the operator can be reliably mitigated with the simple structure. Further, since the operation ranges of the neutral and shift switches 120, 122 are determined based on the rotational angle of the shift shaft 102, their operating points can be easily and appropriately set.

In the apparatus, the neutral operation detector determines that the neutral operation is conducted when the shift switch (122) produces the output while the neutral switch (120) produces no output. With this, it becomes possible to accurately detect the switching timing of the shift position from the in-gear position to the neutral position (i.e., the neutral operation) and the driving force decreasing control can be started at the more suitable timing.

In the apparatus, the prime mover (44) comprises an internal combustion engine (44) and the driving force controller decreases the driving force of the prime mover by conducting at least one of ignition cut-off, ignition timing retarding and decrease of a fuel injection amount in the engine. With this, the driving force of the prime mover 44 can be reliably decreased, thereby mitigating the load on the operator caused by the shift lever manipulation.

In the apparatus, the neutral switch (120) and the shift switch (122) are positioned to be able to contact with a cam (shift arm 110, cam 130) installed coaxially with the shift shaft (102) and produce the outputs upon contacting with the cam. With this, the structures of the neutral switch 120 and shift switch 122 can be further simple.

In the apparatus, the prime mover (44) comprises an internal combustion engine (44), and the apparatus further includes: a driving force decreasing control stopper (ECU 26, S18, S218 to S230. S302, S418 to S430) adapted to stop the driving force decreasing control when a speed (NE) of the engine becomes equal to or less than a predetermined engine speed (stall limit engine speed NEa) after the driving force decreasing control is conducted or when the driving force decreasing control is conducted a predetermined number of times or more.

With this, even when, for instance, the shift lever 22 is slowly manipulated from the in-gear position to the neutral position, the driving force decreasing control can be stopped before the engine 44 operation becomes unstable, i.e., it makes possible to avoid longer execution of the driving force decreasing control than necessary. Specifically, the driving force decreasing control can be appropriately conducted, while avoiding unstable operation of the engine 44.

In the first embodiment, the apparatus further includes a deceleration instruction determiner (throttle opening sensor 132, ECU 26, S14) adapted to determine whether deceleration is instructed to the engine (44) by the operator; and a driving force decreasing control stopper (ECU 26, S20) adapted to stop the driving force decreasing control when the deceleration is determined to be instructed. With this, it becomes possible to prevent occurrence of so-called water hammer that may be caused by suction of water through the exhaust pipe 78.

To be more specific, in the case where the shift lever 22 is swiftly manipulated toward the reverse position (i.e., the (rapid) deceleration is instructed to the engine 44) with the shift position in the forward position (with the clutch 94 engaged with the forward gear 90), if the driving force decreasing control is executed at that time, it makes easy to release the engagement with the forward gear 90 (in-gear condition) and accordingly, the shift position is rapidly changed from the forward position to the reverse position at once. In this case, the clutch 94 is sometimes engaged with the reverse gear 92 with the propeller 82 still rotating in the forward direction and it may lead to the reverse rotation of the engine 44, so that water is sucked through the exhaust pipe 78. As a result, the water hammer occurs and it may give damages to the engine 44. However, since this embodiment is configured to stop (or not to conduct) the driving force decreasing control as mentioned above, the engagement with the forward gear 90 is not easily released and it makes possible to delay the timing of shift position change to the reverse position, thereby preventing occurrence of the water hammer.

In the second embodiment, the apparatus further includes an in-gear operation detector (neutral switch 120, shift switch 122, ECU 26, S300, S304, S100 to S108a, S502, S504) adapted to detect an in-gear operation in which the shift position is switched from the neutral position to the in-gear position, and the driving force controller increases the decreased driving force when the in-gear operation is detected after the driving force decreasing control is finished (S304, 5502 to S506).

With this, even when the shift position becomes the neutral position and then, again becomes the in-gear position immediately after the driving force decreasing control is finished (i.e., even when the load acts on the engine 44 immediately after the same), since the driving force of the engine 44 is increased in advance, the engine stall can be avoided or prevented.

The apparatus further includes a time measuring unit (timer T, ECU 26, S302, S438) adapted to measure elapsed time since the driving force decreasing control is finished, and the time measuring unit stops the driving force controller from increasing the driving force when the measured elapsed time reaches a predetermined value (Ta) even if the in-gear operation is detected (S304, S500, S508). With this, unnecessary increase in the driving force can be avoided.

Specifically, although the operating condition of the engine 44 becomes temporarily unstable due to the driving force decreasing control, once the elapsed time after the control is finished reaches the predetermined value Ta, the operating condition is restored and stabilized. Since it is not necessary to increase the driving force under such a stable condition, it is configured to stop the driving force controller from increasing the driving force even if the in-gear operation is detected, thereby avoiding unnecessary increase in the driving force.

It should be noted that, in the foregoing, although the engine is exemplified as the prime mover, it may be an electric motor or a hybrid combination of an engine and electric motor.

It should also be noted that, although the outboard motor is taken as an example, this invention can be applied to an inboard/outboard motor. Further, although the predetermined values DTHa and Ta, stall limit engine speed NEa, predetermined number of times, displacement of the engine 44 and other values are indicated with specific values in the foregoing, they are only examples and not limited thereto.

Japanese Patent Application Nos. 2011-031192, 2011-031193 and 2011-031194, all filed on Feb. 16, 2011, are incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling operation of an outboard motor having a shift shaft to be rotated in response to manipulation by an operator to switch a shift position between an in-gear position that enables driving force of a prime mover to be transmitted to a propeller by engaging a clutch with one of a forward gear and a reverse gear and a neutral position that cuts off transmission of the driving force by disengaging the clutch from the forward or reverse gear, comprising:
an electronic control unit that:
detects a neutral operation in which the shift position is switched from the in-gear position to the neutral position;
conducts driving force decreasing control to decrease the driving force of the prime mover when the neutral operation is detected;
detects an in-gear operation in which the shift position is switched from the neutral position to the in-gear position; and
increases the decreased driving force when the in-gear operation is detected after the driving force decreasing control is finished,
wherein the electronic control unit finishes the driving force decreasing control when a speed of the engine becomes equal to or less than a predetermined engine speed after the driving force decreasing control is conducted, or when the driving force decreasing control is conducted a predetermined number of times or more,
measures elapsed time since the driving force decreasing control is finished, and
stops increasing the driving force when the measured elapsed time reaches a predetermined value even if the in-gear operation is detected.

2. The apparatus according to claim 1, further including:
a neutral switch that is connected to the shift shaft and produces an output when a rotational angle of the shift shaft is within a first operation range indicative of the neutral position; and
a shift switch that is connected to the shift shaft and produces an output when the rotational angle of the shift shaft is within a second operation range including the first operation range and additional ranges successively added to both sides of the first operation range,
wherein the electronic control unit detects the neutral operation based on the outputs of the neutral switch and the shift switch.

3. The apparatus according to claim 2, wherein the electronic control unit determines that the neutral operation is conducted when the shift switch produces the output while the neutral switch produces no output.

4. The apparatus according to claim 2, wherein the neutral switch and the shift switch are positioned to be able to contact with a cam installed coaxially with the shift shaft and produce the outputs upon contacting with the cam.

5. The apparatus according to claim 1, wherein the prime mover comprises an internal combustion engine and the electronic control unit decreases the driving force of the prime mover by conducting at least one of ignition cut-off, ignition timing retarding and decrease of a fuel injection amount in the engine.

6. The apparatus according to claim 1, wherein the prime mover comprises an internal combustion engine,
and the electronic control unit stops the driving force decreasing control when a speed of the engine becomes equal to or less than a predetermined engine speed after the driving force decreasing control is conducted or when the driving force decreasing control is conducted a predetermined number of times or more.

7. The apparatus according to claim 6, wherein the electronic control unit decreases the driving force of the prime mover by conducting at least one of ignition cut-off, ignition timing retarding and decrease of a fuel injection amount in the engine.

8. The apparatus according to claim 6, further including:
a neutral switch that is connected to the shift shaft and produces an output when a rotational angle of the shift shaft is within a first operation range indicative of the neutral position; and
a shift switch that is connected to the shift shaft and produces an output when the rotational angle of the shift shaft is within a second operation range including the first operation range and additional ranges successively added to both sides of the first operation range,
wherein the electronic control unit detects the neutral operation based on the outputs of the neutral switch and the shift switch.

9. The apparatus according to claim 6, wherein the electronic control unit
determines whether deceleration is instructed to the engine by the operator; and
stops the driving force decreasing control when the deceleration is determined to be instructed.

10. The apparatus according to claim 1, wherein the prime mover comprises an internal combustion engine and the electronic control unit decreases the driving force of the prime mover by cutting off ignition, retarding ignition timing or decreasing a fuel injection amount in the engine.

11. An apparatus for controlling operation of an outboard motor having a shift shaft to be rotated in response to manipulation by an operator to switch a shift position between an in-gear position that enables driving force of a prime mover to be transmitted to a propeller by engaging a clutch with one of a forward gear and a reverse gear, and a neutral position that cuts off transmission of the driving force by disengaging the clutch from the forward or reverse gear, comprising:
an electronic control unit that includes neutral operation detecting means connected to the shift shaft and for detecting a neutral operation in which the shift position is switched from the in-gear position to the neutral position;
driving force controlling means for conducting driving force decreasing control to decrease the driving force of the prime mover when the neutral operation is detected;
in-gear operation detecting means for detecting an in-gear operation in which the shift position is switched from the neutral position to the in-gear position; and
driving force increasing means for increasing the decreased driving force when the in-gear operation is detected after the driving force decreasing control is finished,
wherein the electronic control unit finishes the driving force decreasing control when a speed of the engine becomes equal to or less than a predetermined engine speed after the driving force decreasing control is conducted, or when the driving force decreasing control is conducted a predetermined number of times or more,
measures elapsed time since the driving force decreasing control is finished, and
stops increasing the driving force when the measured elapsed time reaches a predetermined value even if the in-gear operation is detected.

12. The apparatus according to claim 11, wherein the neutral operation detecting means comprises:
a neutral switch that produces an output when a rotational angle of the shift shaft is within a first operation range indicative of the neutral position; and
a shift switch that produces an output when the rotational angle of the shift shaft is within a second operation range including the first operation range and additional ranges successively added to both sides of the first operation range, and the electronic control unit detects the neutral operation based on the outputs of the neutral switch and the shift switch.

13. The apparatus according to claim 11, wherein the prime mover comprises an internal combustion engine, and the electronic control unit further includes driving force decreasing control stopping means for stopping the driving force decreasing control when a speed of the engine becomes equal to or less than a predetermined engine speed after the driving force decreasing control is conducted or when the driving force decreasing control is conducted a predetermined number of times or more.

14. The apparatus according to claim 11, wherein the electronic control unit includes in-gear operation detecting means for detecting an in-gear operation in which the shift position is switched from the neutral position to the in-gear position, and the driving force controlling means increases the decreased driving force when the in-gear operation is detected after the driving force decreasing control is finished.

15. A method for controlling operation of an outboard motor having a shift shaft to be rotated in response to manipulation by an operator to switch a shift position between an in-gear position that enables driving force of a prime mover to be transmitted to a propeller by engaging a clutch with one of a forward gear and a reverse gear and a neutral position that cuts off transmission of the driving force by disengaging the clutch from the forward or reverse gear, and a neutral operation detector that is connected to the shift shaft and detects a neutral operation in which the shift position is switched from the in-gear position to the neutral position, comprising the step of:

conducting driving force decreasing control to decrease the driving force of the prime mover when the neutral operation is detected;

detecting an in-gear operation to detect and in-gear operation in which the shift position is switched from the neutral position to the in-gear position; and conducting driving force increasing control to increase the decreased driving force when the in-gear operation is detected after the driving force decreasing control is finished, finishing the driving force decreasing control to finish the driving force decreasing control when a speed of the engine becomes equal to or less than a predetermined engine speed after the driving force decreasing control is conducted, or when the driving force decreasing control is conducted a predetermined number of times or more, measuring an elapsed time since the driving force decreasing control is finished, and stopping increasing the driving force to stop increasing the driving force when the measured elapsed time reaches a predetermined value even if the in-gear operation is detected.

16. The method according to claim 15, wherein the neutral operation detector comprises:

a neutral switch that produces an output when a rotational angle of the shift shaft is within a first operation range indicative of the neutral position; and a shift switch that produces an output when the rotational angle of the shift shaft is within a second operation range including the first operation range and additional ranges successively added to both sides of the first operation range, and detects the neutral operation based on the outputs of the neutral switch and the shift switch.

17. The method according to claim 15, wherein the prime mover comprises an internal combustion engine, and further including the step of:

stopping the driving force decreasing control when a speed of the engine becomes equal to or less than a predetermined engine speed after the driving force decreasing control is conducted or when the driving force decreasing control is conducted a predetermined number of times or more.

* * * * *